United States Patent [19]
Heddes et al.

[11] Patent Number: 5,432,908
[45] Date of Patent: Jul. 11, 1995

[54] HIGH SPEED BUFFER MANAGEMENT OF SHARE MEMORY USING LINKED LISTS AND PLURAL BUFFER MANAGERS FOR PROCESSING MULTIPLE REQUESTS CONCURRENTLY

[75] Inventors: Marco Heddes, Kilchberg; Ronald Luijten, Oberrieden, both of Switzerland

[73] Assignee: International Business Machines Corporation, Armonk, N.Y.

[21] Appl. No.: 313,656

[22] Filed: Sep. 27, 1994

Related U.S. Application Data

[63] Continuation of Ser. No. 862,124, Apr. 2, 1992, abandoned.

[30] Foreign Application Priority Data

Jul. 10, 1991 [EP] European Pat. Off. .......... 91810548

[51] Int. Cl.⁶ ...................... G06F 13/12; G06F 13/14
[52] U.S. Cl. .................................... 395/250; 395/425; 370/60; 364/238.6; 364/238.9; 364/239.6; 364/DIG. 1
[58] Field of Search ....................... 395/250, 325, 800; 370/60; 364/200

[56] References Cited

U.S. PATENT DOCUMENTS 4,864,495 9/1989 Inaba .................................. 364/200
4,881,167 11/1989 Sasaki et al. ....................... 364/200

OTHER PUBLICATIONS

IBM Technical Disclosure Bulletin, vol. 32, No. 3B, Aug. 1989, New York pp. 488–492, A. P. Engbersen, "Algorithm for Managing Multiple First-in, First-Out Quese from a Single Shared Random-Access Memory".

IBM Technical Disclosure Bulletin, vol. 30, No. 12, May 1988, New York, pp. 360–362, "Queuing/requeuing Technique".

IBM Technical Disclosure Bulletin, vol. 32, No. 9A, Feb. 1990, New York, pp. 483–487, "Cut-through Switch for Frame Relay Networks".

*Primary Examiner*—Thomas C. Lee
*Assistant Examiner*—Le Hien Luu
*Attorney, Agent, or Firm*—John J. Timar

[57] ABSTRACT

The present invention relates to the management of a large and fast memory. The memory is logically subdivided into several smaller parts called buffers. A buffer-control memory (11) having as many sections for buffer-control records as buffers exist is employed together with a buffer manager (12). The buffer manager (12) organizes and controls the buffers by keeping the corresponding buffer-control records in linked lists. A request manager (20), as pad of the buffer manager (12), does or does not grant the allocation of a buffer. A stack manager (21) controls the free buffers by keeping the buffer-control records in a stack (23.1), and a FIFO manager (22) keeps the buffer-control records of allocated buffers in FIFO linked lists (23.2–23.n). The stack and FIFO managers (20), (21) are parts of the buffer manager (12), too.

14 Claims, 9 Drawing Sheets

5,432,908

HIGH SPEED BUFFER MANAGEMENT OF SHARE MEMORY USING LINKED LISTS AND PLURAL BUFFER MANAGERS FOR PROCESSING MULTIPLE REQUESTS CONCURRENTLY

This is a continuation of Ser. No. 07/862,124 filed on Apr. 2, 1992 now abandoned.

TECHNICAL FIELD

The present invention relates to the management of a large and fast memory to which multiple users have access. The memory is logically subdivided into several smaller parts called buffers. A buffer-control memory having as many sections for buffer-control records (BCRs) as buffer exist is employed and a buffer manager is organizing and controlling these buffers by keeping the corresponding BCRs in linked lists. The BCRs of free buffers are kept in a free buffer linked list and the BCRs of allocated buffers in linked lists according to its users. The buffer manager does or does not grant the allocation of a buffer on request of a user, supplies the addresses of the buffers to the users and keeps the different linked lists in said buffer-control memory. The high speed buffer management as claimed may be used in a protocol adapter in a broadband switch of a communication network or in other high speed protocol implementations. In addition it may be used in other areas where instead of buffer management any type of high-speed resource management is required.

BACKGROUND OF THE INVENTION

With the increasing number of information to be processed, and the growing amount of data to be transmitted, fast switching of information becomes an important task in any communication network. The network nodes in which lines or transmission links are interconnected so that information may be exchanged between them are often causing delay in the network. It is therefore desirable to have switching nodes being fast and practically non-blocking. For the protocol adapters of such switching nodes, large and fast memories are required. In addition the management of these memories has to be fast, flexible, and very efficient to allow an adaptation of the system to different load situations.

The present invention relates mainly to communication networks with switching subsystems comprising a hardware implementation of the high speed buffer management according to this invention. The embodiments hereinafter described may be used as pad of a broadband switch for Gigabit local-area-networks, or for interconnecting supercomputers.

The nearest prior art is given by the article of A. P. Engbersen, "Algorithm For Managing Multiple First-In, First-Out Queues From A Single Shared Random-Access Memory", IBM Technical Disclosure Bulletin, Vol. 32, No. 3B, pp. 488–492, August 1989. A management technique for a plurality of queues in a single shared random-access memory (RAM) is given, which avoids the 'garbage-collection' operation of re-organizing the fragmented memory required by known techniques. In this disclosure the queue elements are stored in this RAM, called data RAM, and a second RAM, called n_part RAM, is used to store a pointer which indicates the locations of data in an output queue. The system works by having a register at every output port to indicate the address in the data RAM from which the next data is to be read. The register is updated whilst the data are being transmitted by reading, from the n_part RAM at the same address as the address at which the data were stored in the data RAM, the address at which the next data in the output queue are stored. The hardware implementation of this technique is complex and not as fast as the present high speed management implementation, such that less clock cycles are necessary.

SUMMARY OF THE INVENTION

It is an object of the present invention to provide a technique for buffer management which does not require a 'garbage-collection' operation for reorganization.

Another object of the present invention is to provide a technique for buffer management which is implementable at high speed.

A further object is to provide a high speed buffer management designed for an employment as pad of a protocol adapter in a high speed communication network.

It is another object of the invention to provide a buffer management which is very general and can be simply adapted to different requirements.

The invention as claimed is intended to meet these objectives and to remedy the remaining problems and deficiencies of known software or hardware solutions. In the inventive high speed buffer management technique this is accomplished in that the shared large and fast memory is logically subdivided into several buffers, being organized and controlled by a buffer manager in combination with linked lists. This indirect addressing by the employment of linked lists allows a simple scheme and is therefore implementable for high speed. The buffers are allocatable and accessible by request of the users, such that data can be stored to, or read from, these buffers. The access to the buffers is controlled by rules being implemented in the buffer manager.

Some advantages of the present invention are listed below:

Several buffer management schemes can be implemented, such that various strategies for granting a buffer request can be realized.

Variable buffer sizes are possible (on a per virtual channel base).

Each of the operations: "request buffer", "put buffer into FIFO", "get buffer from FIFO", and "release buffer" can be performed in four cycles (compared to five cycles with the implementation as described in the above cited IBM Technical Disclosure Bulletin article of A. P. Engbersen). These operations can be executed concurrently.

Not only a multiple FIFO queue can be implemented, but also a multiple LIFO (last-in/first-out) queue, by replacing the FIFO manager by (another) stack manager.

The buffer manager of the present implementation is parametrizable at design time, during initialization, and during runtime.

Messages of variable size (defined as the number of packets in a message) can be supported.

DESCRIPTION OF THE DRAWINGS

The invention is described in detail below with reference to the following drawings.

GENERAL DESCRIPTION

The following description relates mainly to a protocol adapter being pad of a switching subsystem of a network. The adapter is a transceiver operating on the user side with a large and fast shared memory, and sending and receiving packets on the switch side. The large and fast memory is logically subdivided into smaller units, hereinafter referred to as buffers, allocatable and therewith accessible by multiple users. If the memory is to be shared by these users, rules have to be implemented for the assignment of buffers to users to prevent problems, and for using the given memory capacity very efficiently.

Figure 1:
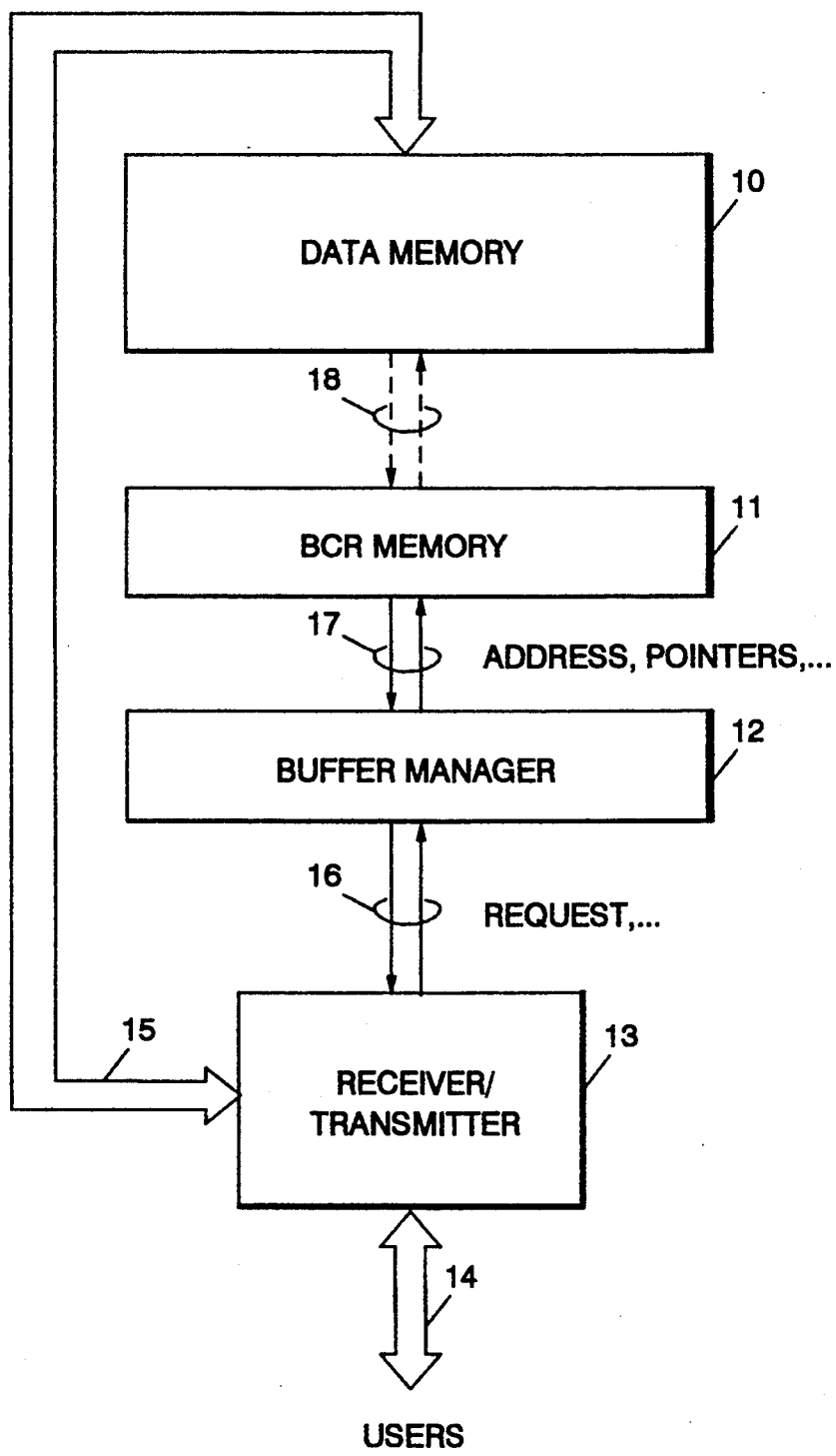
FIG. 1 shows a global block diagram of a system comprising a hardware implementation of the present invention.

The first embodiment is a hardware implementation of the inventive high speed buffer management, the embodiment being part of a protocol adapter of a network. The embodiment comprises three main parts, a large data memory 10, a buffer-control-record memory (BCR Memory) 11, and a buffer manager 12, as shown in FIG. 1. Both memories 10 and 11 are random-access memories (RAMs). The BCR memory 11 is subdivided in as many buffer-control-records (BCRs) as buffers exist in the data memory 10, such that each buffer has a corresponding buffer-control-record (BCR). The BCRs are kept in different linked lists in said BCR memory 11, controlled and organized by the buffer manager 12. Multiple users (virtual channels) are connected via a bus 14 to a receiver/transmitter unit 13. On reception of data from a user, one or more buffers are requested depending on the needed space for the data. If there are enough free buffers available and the rules implemented in the buffer manager 12 are satisfied, the request will be granted by the manager 12. The requested free buffers are popped from a free buffer linked list being kept in the BCR memory 11, and the addresses of the buffers are made available to the buffer manager 12 and the receiver 13. With these addresses, hereinafter referred to as UserData, the buffers are allocated in the random-access data memory 10, and the receiver 13, and therewith the user itself has access to the data memory 10.

Figure 2:
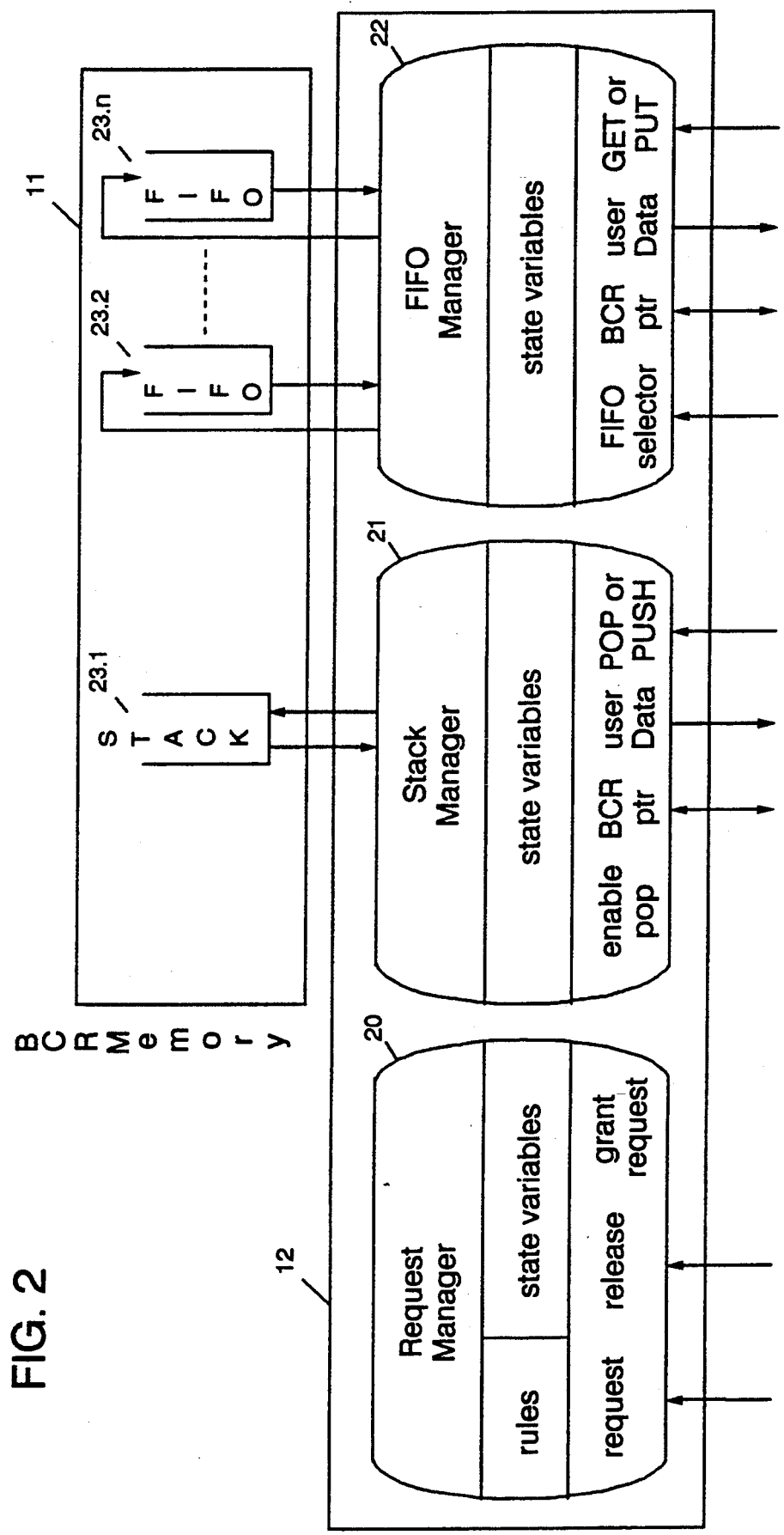
FIG. 2 shows a buffer manager with stack- and FIFO linked lists being stored in a BCR memory.

The buffer manager 12 of the first embodiment consists of three building blocks, a request manager 20, a stack manager 21, and a first-in/first-out manager 22 (FIFO manager), as illustrated in FIG. 2. Based on some rules to be described later, the request manager 20 does or does not grant the requests of buffers. If a request is granted by the request manager 20, the BCR corresponding to the free buffer being requested, is popped from the free buffer linked list in the BCR memory 11, being kept and controlled by the stack manager 21. The BCRs of free buffers are kept in a stack 23.1. The UserData of the buffers being popped from the stack 23.1 are made available, such that the corresponding buffers become accessible. Allocated buffers are kept in different logical queues, one for each user, by adding its BCRs to first-in/first-out linked lists 23.2–23.n. A FIFO manager 22 is employed for controlling and handling these FIFOs 23.2–23.n. The buffers are recycled by processing them using the FIFOs 23.2–23.n and the stack 23.1.

Figure 3:
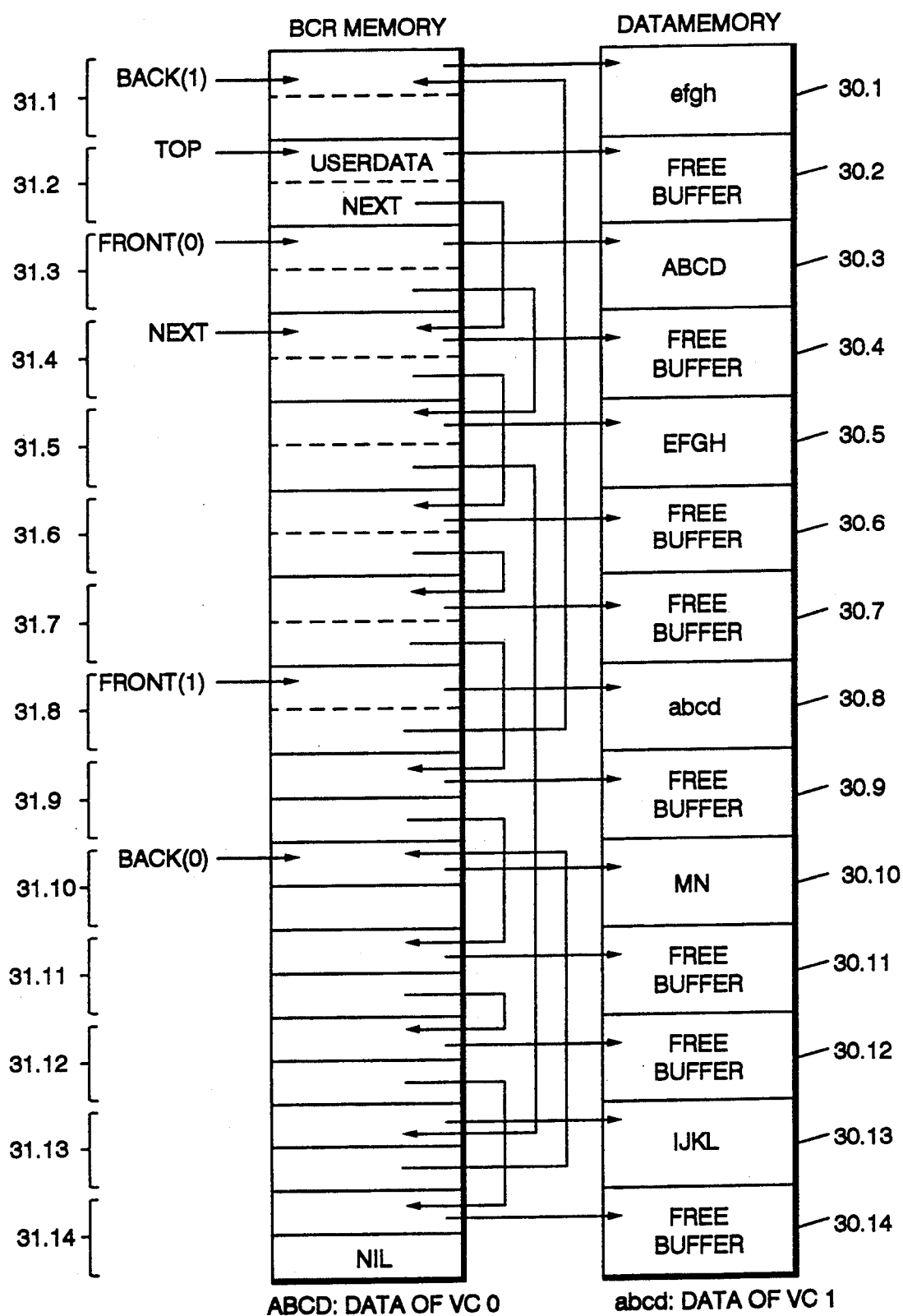
FIG. 3 shows the BCR memory with buffer-control-records (BCRs) and a data memory with buffers.

The organization of the different linked lists in the BCR memory 11 and the buffers in the data memory 10 is illustrated in FIG. 3. In this example, two users, virtual channels (VC0, VC1) had access to the data memory 10. Data of the first virtual channel are shown as upper case letters ($ABC...A$) and data of the second virtual channel are shown as lower case letters ($abcd...h$). As shown in FIG. 3, the buffers 30.3, 30.5, 30.13, and 30.10 contain data of virtual channel VC0, buffers 30.8 and 30.1 contain data of VC1, and the remaining buffers are free. The corresponding BCRs, being stored in the BCR memory 11, have two fields. The first one is the UserData field, comprising in this embodiment the address of the corresponding buffer in the data memory 10, and the second field is a pointer, called next, to another BCR. The BCRs of the free buffers 30.2, 30.4, 30.6, 30.7, 30.9, 30.11, 30.12, and 30.14 are kept in a free buffer linked list in the BCR memory 11. This linked list begins with BCR 31.2 and is linked by pointers to the following BCRs. The pointer field comprises address of the next BCR, being schematically shown as light grey arrows from one BCR to another. The free buffer linked list behaves like a stack 23.1, shown in FIG. 2, and has a pointer top marking the first UserData field of the stack. For a stack no pointer is necessary at its end, such that the last BCR 31.14 of the stack ends with a nil field.

The BCRs of the buffers being allocated by VC0 and VC1 are kept in two FIFO linked lists. The first one starts with a front(0) pointer, see BCR 31.3, and ends at BCR 31.10 with a back(0) pointer. The second linked list is pointed to by front(1) and its last BCR 31.1 is pointed to by back(1). The next fields of the BCRs corresponding to the allocated buffers contain the addresses of the following BCRs, such that the lists of VC0 and VC1 behave like FIFO lists. The order of succession within these FIFOs is illustrated by arrows.

The use of the three components 20–22 of the buffer manager 12 will be clarified by means of the following example, wherein the inventive system is part of a High Speed Switch or High Speed LAN adapter. We consider a protocol engine consisting of a receiver and a transmitter pad 13.

The receiver performs the below described actions upon reception of a data block. The term block, as herein referred to, is used to indicate units of data known in the literature as a frame, packet or cell. It determines the connection identifier (ID), called virtual channel identifier (VCID) and requests a buffer. The request manager 20 determines if the request will be granted, symbolized as 'grant request' in FIG. 2, and enables the stack manager 21 to pop a free buffer from the stack 23.1. Therewith a pointer to this free buffer as well as a pointer to the corresponding BCR is returned by the stack manager 21. The pointer to the free buffer is its address, such that the received data can be stored in this buffer. Then the receiver will put this buffer and its BCR in the FIFO corresponding to the virtual channel. This is done by performing a PUT operation on the FIFO manager 22 with as parameters the VCID and BCR pointer. The buffer which has been removed from the free buffer linked list has been added to the FIFO linked list of the virtual channel. In the case large data packets have to be received, the process of requesting a buffer, etc. is executed repetitively. Special rules could be implemented to support this feature efficiently.

The transmitter performs the following actions. If enough data of a virtual channel (VC0) have been received (e.g. if a message consisting of several data blocks have been completed), the transmitter reads the corresponding FIFO. The first BCR 31.3 of this FIFO, pointed to by front(0), and the UserData of the corresponding buffer 30.3 is returned by the FIFO manager 22. The address of the buffer 30.3 is given by UserData and the data stored in this buffer can be read and transmitted, possibly prefixed with a header generated by the transmitter. After reading of the data has been completed, the buffer has to be marked free. This is done by performing a RELEASE operation on the request manager 20 and by pushing (PUSH) the buffer (identified by the UserData) on the stack 23.1. The transmitter may continue reading until all bytes being stored have been transmitted. The number of free buffers increases with each buffer being released.

The necessary synchronization mechanisms, which depend on the whole system and are not influenced by the inventive buffer management, are not described.

The request manager 20 of the first embodiment and possible rules that can be implemented are described below.

1) Request Manager

A maximum number of buffers (locMax[i]) is assigned to each virtual channel [i], such that the maximum number of buffers being allocatable by virtual channel [i] is limited by locMax[i]. This is to prevent a few users (VCs) to consume all available free buffers. In addition a number of private buffers (privMin[i]) is assigned to each user, such that these buffers are reserved for the corresponding user. These buffers are not allocatable by other users. As long as a user has not consumed all its private buffers, a buffer request of the user will always be granted.

Based on these rules and the above defined variables, the following buffer management schemes, are possible:

Fixed scheme: The data memory 10 is partitioned in fixed parts, each private for one VC. For example privMin[i]=locMax[i], or privMin[i] is not used and SUM locMax[i]="total number of available buffers".

Shared scheme: The data memory 10 is completely shared between all channels. No request manager is necessary, only a stack of free buffers.

Shared with Max scheme: As, shared, but with a limit on the number of outstanding buffers per VC (for example privMin[i] is not used).

Shared with private scheme: As, shared, but with a reserved number of private buffers per VC (for example locMax[i] is not used).

Combined scheme: It is a combination of the latter two schemes.

The combined scheme is the most general and complex one and is implemented in the first embodiment.

Figure 4:
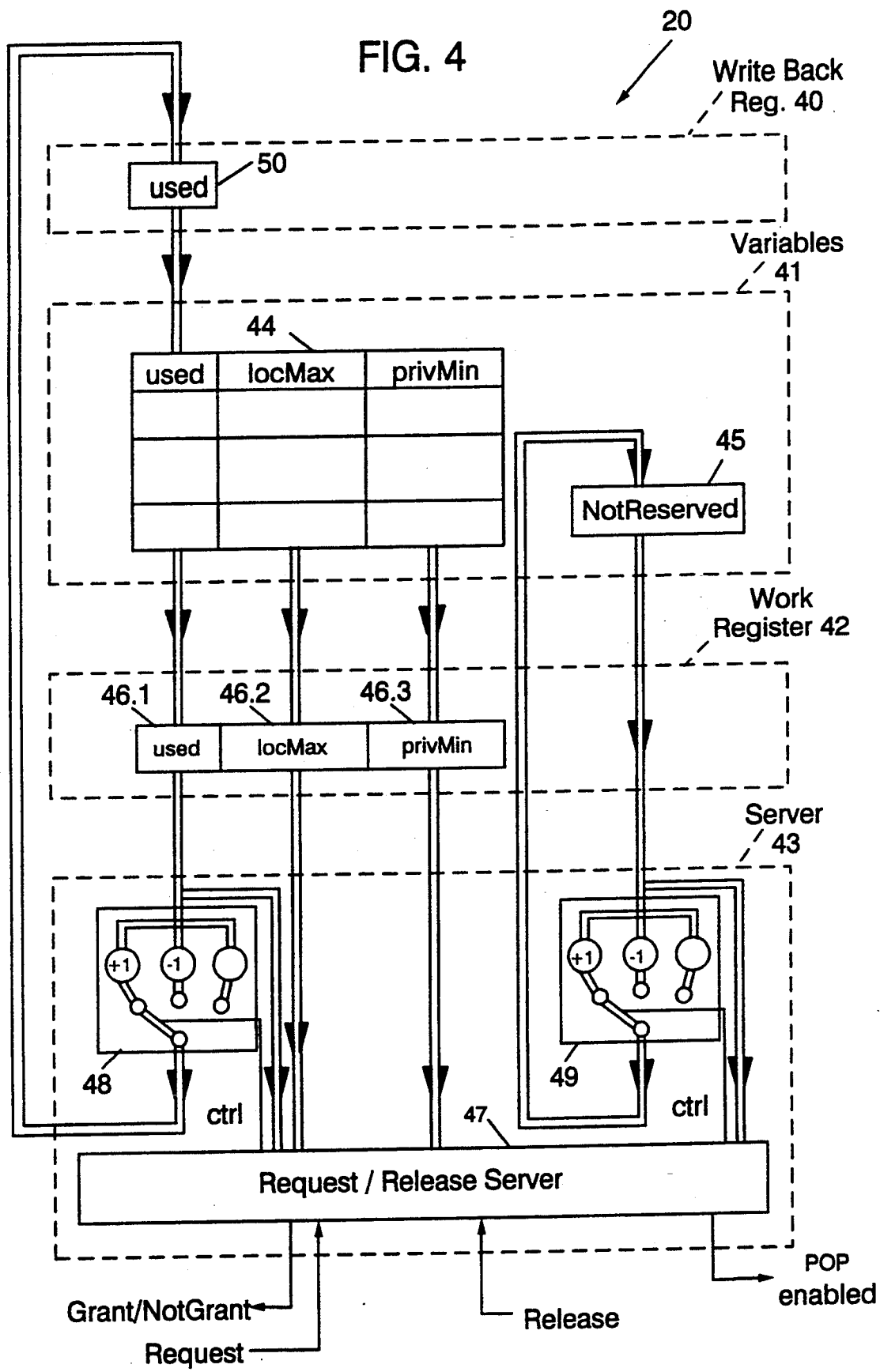
FIG. 4 shows a block diagram of a request manager being pad of the inventive buffer manager.

A hardware implementation of the request manager 20 is illustrated in FIG. 4. The request manager 20 manages the request and release of buffers by employment of implemented rules, as described above, and by using local and global variables (local to the virtual channels). If the request manager 20 granted a request, it is the users own task to really get the buffer by popping (POP) it from the stack 23.1 of free buffers. After use of a buffer it has to be released. This requires a RELEASE command to the request manager 20 as well as a PUSH command, such that the buffer is pushed on the stack 23.1.

In the following, an implementation of the above mentioned combined scheme is described. In case of other schemes, the hardware can be simplified.

The state variables given below are used for the implementation of the buffer management rules.

used[i]: This parameter (local to VC(i)) denotes the number of buffers being currently used by VC(i). A granted request will increment this parameter, and a release will decrement it.

locMax[i]: The maximum number of buffers which may be used by VC(i). It is a constant for the request manager, although it may be modified by a control processor for example.

privMin[i]: The number of buffers which are reserved for private use by VC(i). It is also a constant for the request manager 20 and may be modified as locMax[i].

NotReserved: If FreeBuffers denote the total number of free buffers and ResBuffers denote the total number of reserved buffers (that is, not yet requested private buffers), then NotReserved is defined to denote the number of free buffers which are not reserved, as given by equation:

$$NotReserved = FreeBuffers - ResBuffers \qquad (1)$$

More details are given in the listings below.

The operations of the request manager 20, to be performed on these variables, are shown in the following listings, which are written using "Pseudo Pascal" syntax.

```
initialization
for all i do
begin
    used [i]     := 0;
    privMin [i]  := "as appropriate";
    locMax[i]    := "as appropriate";
end;
NotReserved     := "Total # of buffers" − SUM (privMin[i]);
```

```
function request
{ i is the virtual channel ID }
if (used[i] < privMin[i])
    then
        begin
            used[i] := used[i] + 1;
            Request := "granted";
        end
    else if (NotReserved > 0) and (used[i] < locMax[i])
    then
        begin
            used[i] := used[i] + 1;
            NotReserved := NotReserved − 1;
            Request := "granted";
        end
else Request := "not granted";
```

```
function release
{ i is the virtual channel ID }
if (used [i] ≦ privMin[i])
then used [i] := used [i] − 1
```

```
-continued
function release
else
  begin
    used [i] := used [i] − 1;
    NotReserved := NotReserved + 1;
  end;
```

A request manager 20 based on the rules and listings given, can efficiently be implemented with the block diagram shown in FIG. 4. The block diagram consists of the following pads called WriteBackRegister 40 (WriteBackReg), Variables 41, WorkRegister 42, and Server 43. The local variables used[i], locMax[i], and privMin[i] (local with reference to a virtual channel) are stored in a RAM 44. The local variables of VC0 are stored in the upper row of this RAM 44 and the variables of the following users, VC(i) with $i>0$, are stored in the rows below. The global variable NotReserved is stored in a register 45 being pad of the Variables block 41. Three registers 46.1–46.3 are employed for storing the local variables of a VC as read out of the RAM 44, upon request of this VC. The server 43 checks if a request may be granted by using the variables stored in the WorkRegister 42. The check is based on the rules implemented. The different checks are given in the listings, as there are function request and function release. The local variables and the global variable are fed to the request/release server 47 which executes the single steps shown in the listings. The variables are increased or decreased if necessary by using adder/subtracter 48 and 49. These adder/subtracters are connected to and controlled by the request/release server 47. The WriteBackReg 40 is employed comprising a register 50 storing the modified variable used[i] before it is written back into the RAM 41. An additional finite state machine (not shown) controls the operation of the latter four pads 40–43.

The operation of the request manager 20, as illustrated in FIG. 4, is now straightforward. Upon request of a virtual channel. e.g. VC0, the virtual channel identifier (VCID) is used as the address of the local variables in the RAM 44. By using this address, the local variables of the virtual channel are read from the RAM 44 into the registers 46.1–46.3. The server 43 determines if the request can be granted and modifies the local and global variables accordingly, using the algorithms shown in the listing. If a request is granted, the variable used[i] is increased by using adder/subtracter 48 as follows:

$$used[i]:=used[i]+1. \quad (2)$$

The variable NotReserved is decreased as given in equation (3), if buffers are available which are not reserved, $used[i] \geq privMin[i]$, and $used[i] < locMax[i]$.

$$NotReserved:=NotReserved-1. \quad (3)$$

Release of allocated buffers operates in a similar way and the local variable used[i] decreases with each buffer of the virtual channel being released, as given by $$used[i]:=used[i]-1. \quad (4)$$

The global variable NotReserved is increased, if necessary (see listing), and is given by $$NotReserved:=NotReserved+1, \quad (5)$$

A control processor needs access to the variables, at least to be able to initialize them. In addition the variables can be dynamically modified by this processor (e.g based on expected traffic requirements). The modifications are however not trivial and should be executed with care. By modifying the variables it is for example possible to reorganize the large and fast data memory if one of the users is shut-down because of problems, such that the buffers not longer used by this channel, are made available to other users. It is possible to increase execution speed of the server by storing additional variables in the RAM 44. These variables represent results of compare operations (e.g. used[i]<locMax[i]). Consequently, the server can immediately execute the appropriate increment/decrement of the variables, while the comparisons for the next request are performed in parallel with the increments/decrements. The results of the compares are then stored in the RAM so they are available for the next request.

2) Stack Manager

Figure 5:
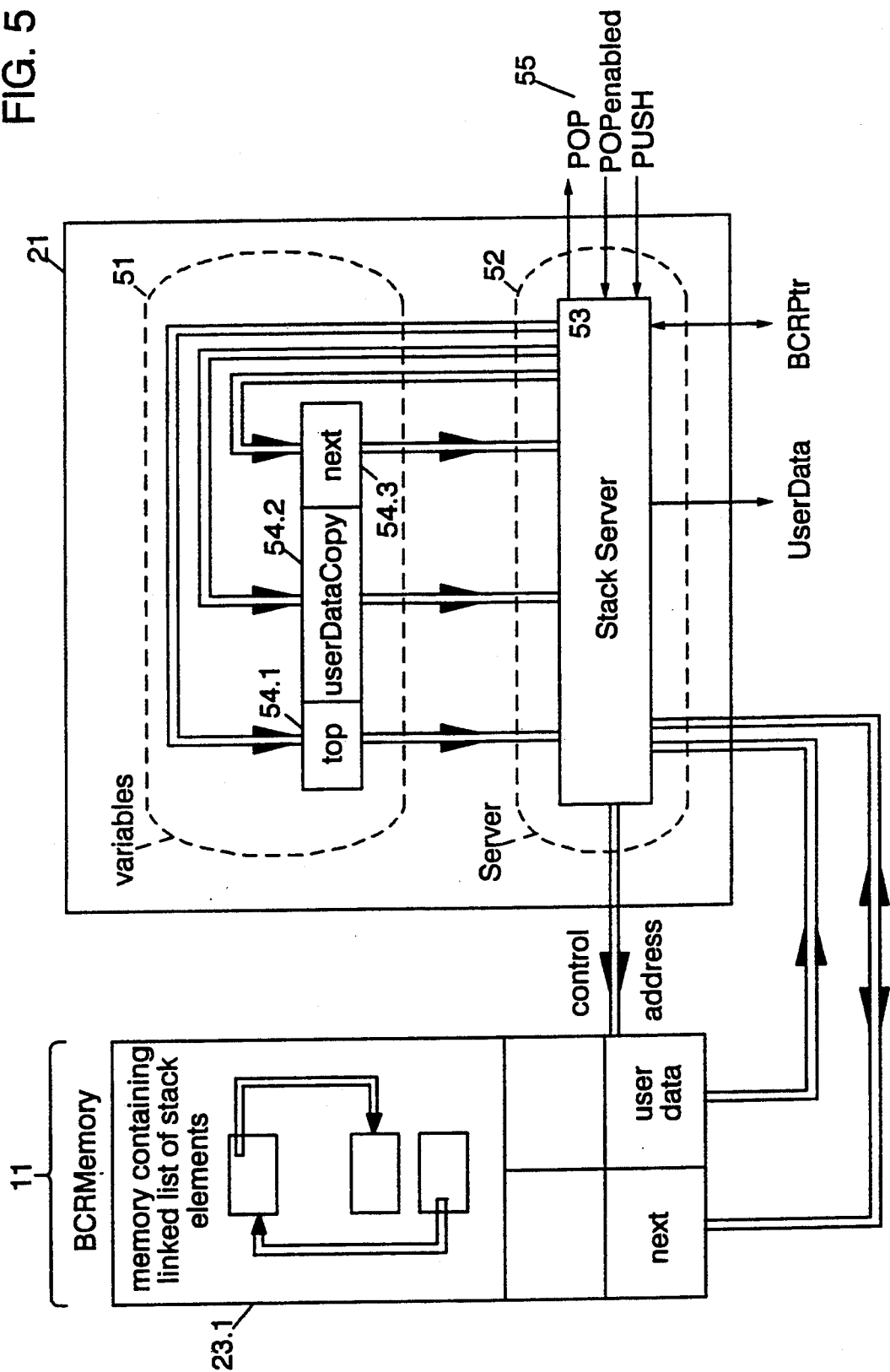
FIG. 5 shows a block diagram of a stack manager being pad of the inventive buffer manager.

In this section a hardware implementation of the stack manager 21 is given. Its block diagram is shown in FIG. 5. The stack manager 21 consists of a Variable 51, and a Server block 52. Three registers, top 54.1, userDataCopy 54.2, and next 54.3, are pad of the Variable block 51. The Server block 52 comprises a stack server 53 which is connected to the BCR memory 11 and to the registers of the Variables block 51. The free buffer linked list, being controlled and organized by the stack manager 21, and being stored in the BCR memory 11, behaves like a stack (stack 23.1, FIG. 2). Each BCR of the stack 23.1 contains UserData (i.e. the physical address of the corresponding buffer) and an additional pointer, herein referred to as next, which is an address in the BCR memory 11, to the next element (BCR) in the list.

If a request is granted, a free buffer has to be popped (POP) from the stack 23.1. The request manager 20 enables the removing of a free buffer from the list via the POPenabled line 55. A POP command removes the first element from the free buffer linked list, returns a pointer to this element (used later for PUT, GET, and PUSH) and also returns the UserData of the corresponding buffer in the data memory 10. For the release of a buffer it is to be inserted in front of the stack 23.1 by using a PUSH command. The UserData are assumed to be constant. Their values are given during initialization by a control processor.

To perform an efficient list management, the following three state variables are used. The state variables are chosen so, that all stack operations require only one access to the BCR memory 11.

top: This is a pointer to the top of the stack 23.1 (see FIG. 3). The pointer is stored in the register 54.1.

UserDataCopy: A copy of the UserData of the top stack element is referred to as UserDataCopy. The copy is kept in the register 54.2.

next: This is a pointer to the next element on the stack 23.1. It is stored in the register 54.3.

A single stack 23.1 can be implemented as shown in FIG. 5. The implementation follows the same concept as the request manager implementation described under section 1) Request Manager. The stack manager 21 needs only global variables, such that the RAM. WorkRegister, and WriteBackReg of the request manager 20 can be omitted. The stack server 53 is mainly used for list management. It is realized by a state machine (not shown) and its functional description is given by the following listings.

| initialization |
| --- |
| Initialize Control Memory<br>   Set up linked list of BCRs and initialize<br>   UserData field of each BCR<br>Initialize state variables:<br>   top := "pointer to first BCR in list";<br>   next := "pointer to 2nd BCR in list"; |

| procedure POP(var theBCRPtr, theUserData) |
| --- |
| {userDataCopy : physical bufferaddress<br>  top   : pointer to BCR      }<br>theBCRPtr  := top;<br>theUserData := userDataCopy;<br>if (next < > nil) and PopEnabled then<br>   begin { stack not empty }<br>      top := next;<br>      userDataCopy := next ↑.userData;<br>      next := next ↑.next;<br>      { the above three statements require<br>        one read in the BCR memory    }<br>  end else top := nil; |

| procedure PUSH(theBCRPtr) |
| --- |
| theBCRPtr ↑.next := top;<br>next := top;<br>top := theBCRPtr;<br>userDataCopy := theBCRPtr ↑.userData;<br>{ the above statements require one (simultaneous)<br>  read/write in the BCR memory    } |

It should be noted that the size of a buffer is determined at initialization time of the system, namely when the BCR memory 11 is initialized. This involves an initial setup of the free buffer linked list, but also of the UserData, which will in most cases consist only of the physical address of the buffer.

3) FIFO Manager

Figure 6:
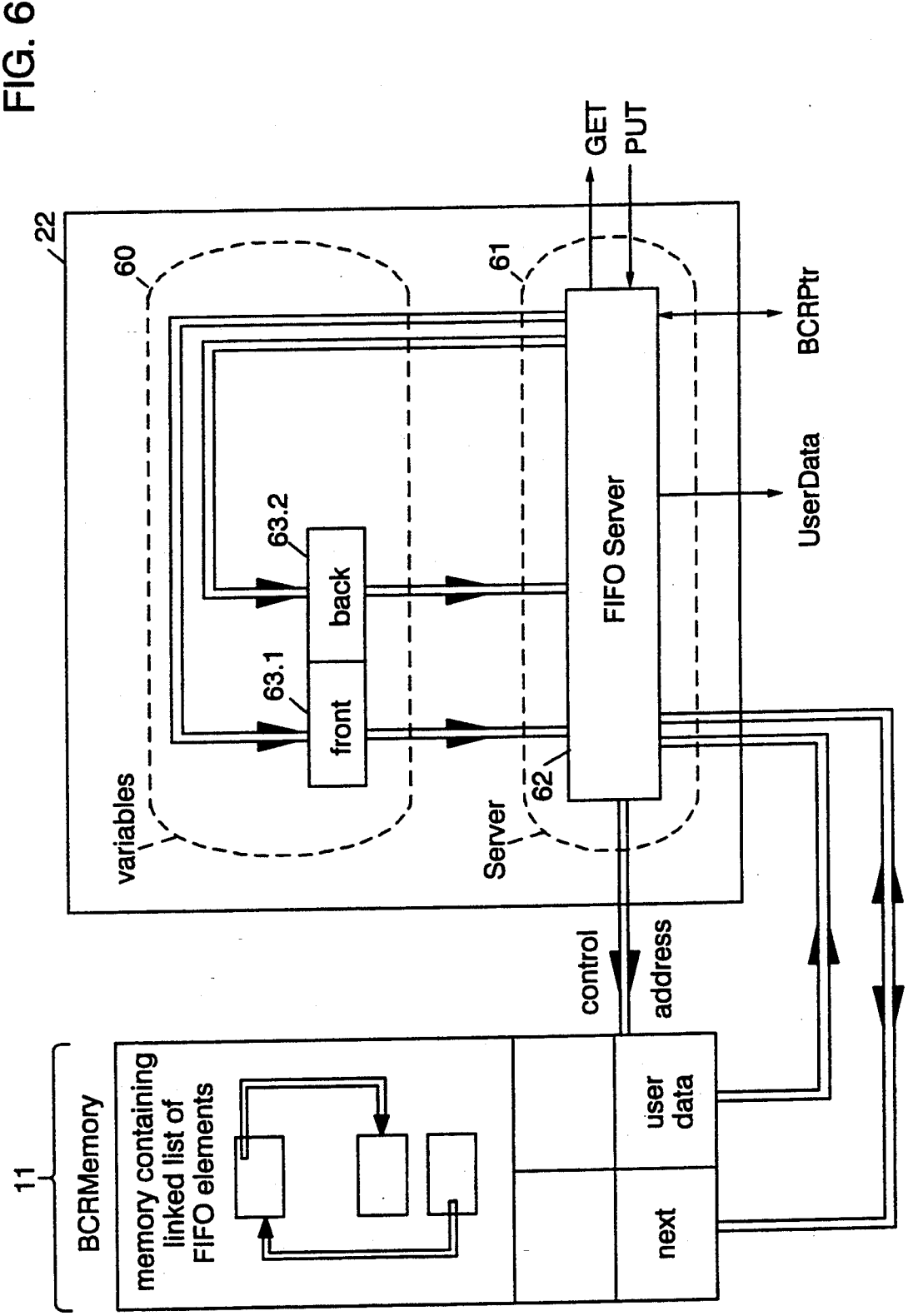
FIG. 6 shows a block diagram of a FIFO manager being pad of the inventive buffer manager.

This section relates to the implementation of the FIFO manager 22 being part of the first embodiment. A block diagram of the FIFO manager 22 is shown in FIG. 6. This implementation is almost the same as the one of the stack manager 21. All FIFO elements (BCRs) are stored in linked lists in the BCR memory 11. The Variables block 60 of the FIFO manager 22 includes two registers, the first one 63.1, herein referred to as front register 63.1, and the second one called back register 63.2. The Server 61 consists of a FIFO server 62 performing an efficient list management. The following state variables are used in the present implementation:

front(i): This is a pointer to the first FIFO element (BCR) of the linked list of the user (i). The front register 63.1 is used for storing it during operation.

back(i): This is a pointer to the last inserted element of the linked list. The back register 63.2 is employed as register for this pointer.

If a request has been granted and a free buffer has been popped from the stack of free buffers 23.1, it has to be inserted at the end of the list of the user. A PUT command is used for inserting it. The PUT procedure, as implemented in the FIFO server 62, is given below (see listing). For removing data from the data memory 10, a GET command removes the first element from the list, returns a pointer to this element and also returns the UserData. Details can be taken from the GET procedure listed below.

| initialization |
| --- |
| Initialize state variables :<br>   front := nil;<br>   back := nil; |

| procedure PUT(theBCRPtr) |
| --- |
| if front = nil then<br>  begin { FIFO was empty }<br>    front := theBCRPtr;<br>    back := theBCRPtr;<br>  end else<br>  begin<br>    back ↑.next := theBCRPtr;<br>    back := theBCRPtr;<br>  end; |

| procedure GET(var theBCRPtr, theUserData) |
| --- |
| { front ↑.UserData: physical address<br>  front     : pointer to BCR   }<br>theBCRPtr  := front;<br>theUserData := front ↑.UserData;<br>if front = back then<br>  begin { FIFO now empty }<br>    front := nil;<br>    back := nil;<br>  end else front := front ↑.next; |

Figure 7:
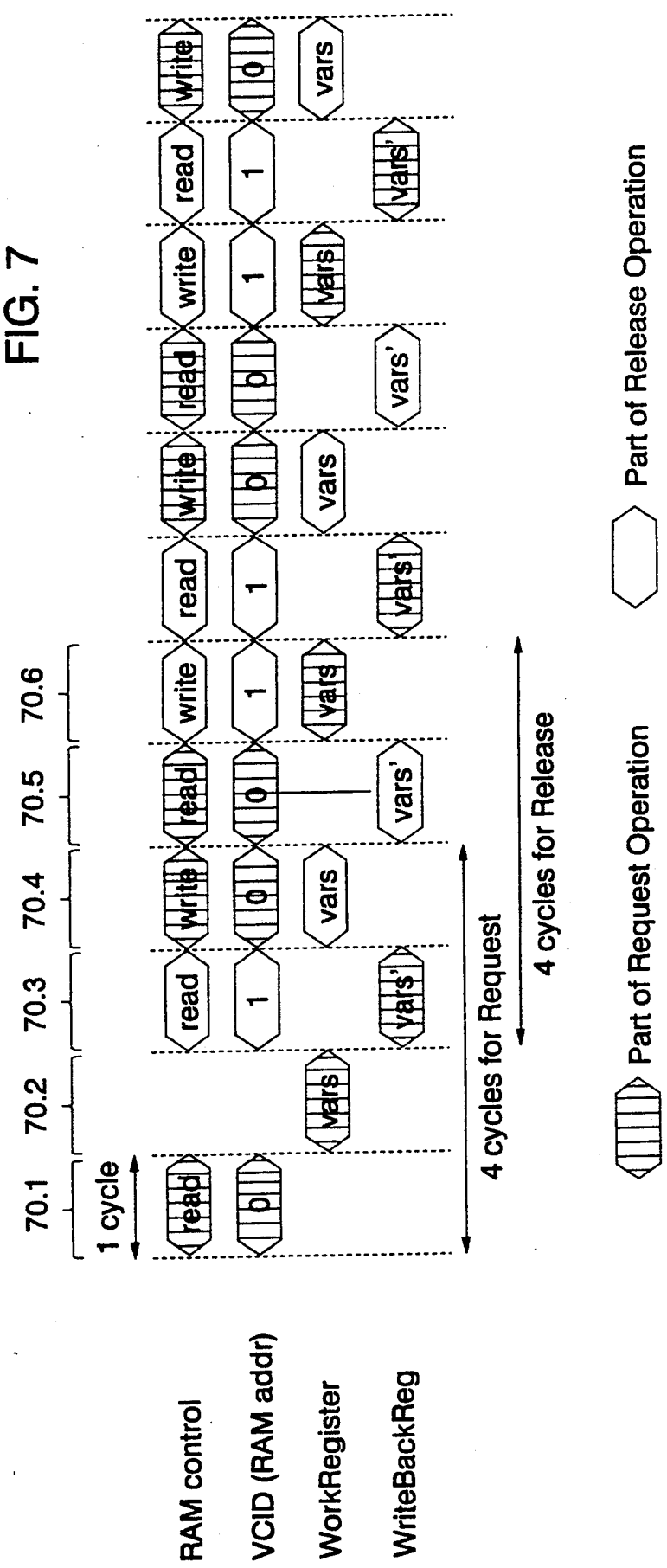
FIG. 7 is a timing diagram for request and release operations of the hardware implementation of the present invention.

After the description of the three components of the buffer manager 12, their performance will be discussed. A request consists of the following four cycles, as illustrated in FIG. 7.

1. During the first cycle 70.1 the local variables used[i], locMax[i], and privMin[i], being stored in the RAM 44, are read. The VCID (VCID of VC0 in FIG. 7) of the requesting user is applied to the RAM 44 and the variables are clocked in the WorkRegister 42.

2. The request/release server 47 determines if a request may be granted and modifies the variables (vats) during cycle 70.2. At the end of the second cycle 70.2 it is thus known, and indicated at POPenabled output of the request manager 20, if the request is granted or not.

3. During the third cycle 70.3, the modified variables (vars ') are clocked in the WriteBackReg 40.

4. The contents of the WriteBackReg 40 is written back to the RAM 44 at its original address, during the fourth cycle 70.4.

In the same way it can be shown that a release also takes four cycles 70.3-70.6. The operations read and write, shown in FIG. 7, are used for reading/writing variables from/to the RAM 44. Reading and writing of data is not shown in the figure. A request and a release can be interleaved, resulting in the capability to do both a request and release (or maybe 2 requests or releases) in four cycles.

As the FIFO manager 22 can be implemented with the same method as the request manager 20, as illustrated in FIG. 6, both a GET and PUT operation can be done in four cycles, as well. For GET and PUT only one access to the BCR memory 11 (RAM 44) is necessary, respectively.

The same principle applies to the stack manager 21. Both a POP and PUSH operation can be done in two cycles, and POP and PUSH need only one BCR memory access each.

A bottleneck may occur in the request/release server 47 of the request manager 20, as a compare has to be done before an increment or decrement. To get the highest performance, the compare and increment/decrement can be done in parallel, where the compare calculates its result for the next request/release. This result must of course be stored with requires an extension of the statevariables with boolean containing the results of the compares, as described before.

Further embodiments are conceivable by implementing the different schemes as described in context with the first embodiment. These embodiments may be based on the one described above. The hardware can be reduced, depending on the scheme which has to be implemented. For a hardware implementation of the shared scheme, or if no rules for the request are required, the request manager can be omitted. For the implementation of the shared with Max scheme, where the variables privMin[i] are not used, the privMin[i]-column of the RAM 44 of the request manager 20, as illustrated in FIG. 4, can be omitted. In addition other functions and procedures as given in the listings can be implemented. Instead of using a stack and stack manager for the free buffers, these buffers can also be organized in a FIFO, which requires of course a FIFO manager to manage the free buffers. With the first embodiment it has been mentioned, that a BCR consists of two fields, the UserData and the next field. In some case, e.g. when the pointer to the BCR can be directly mapped to the physical address of the corresponding buffer, the UserData field can be omitted.

Figure 8:
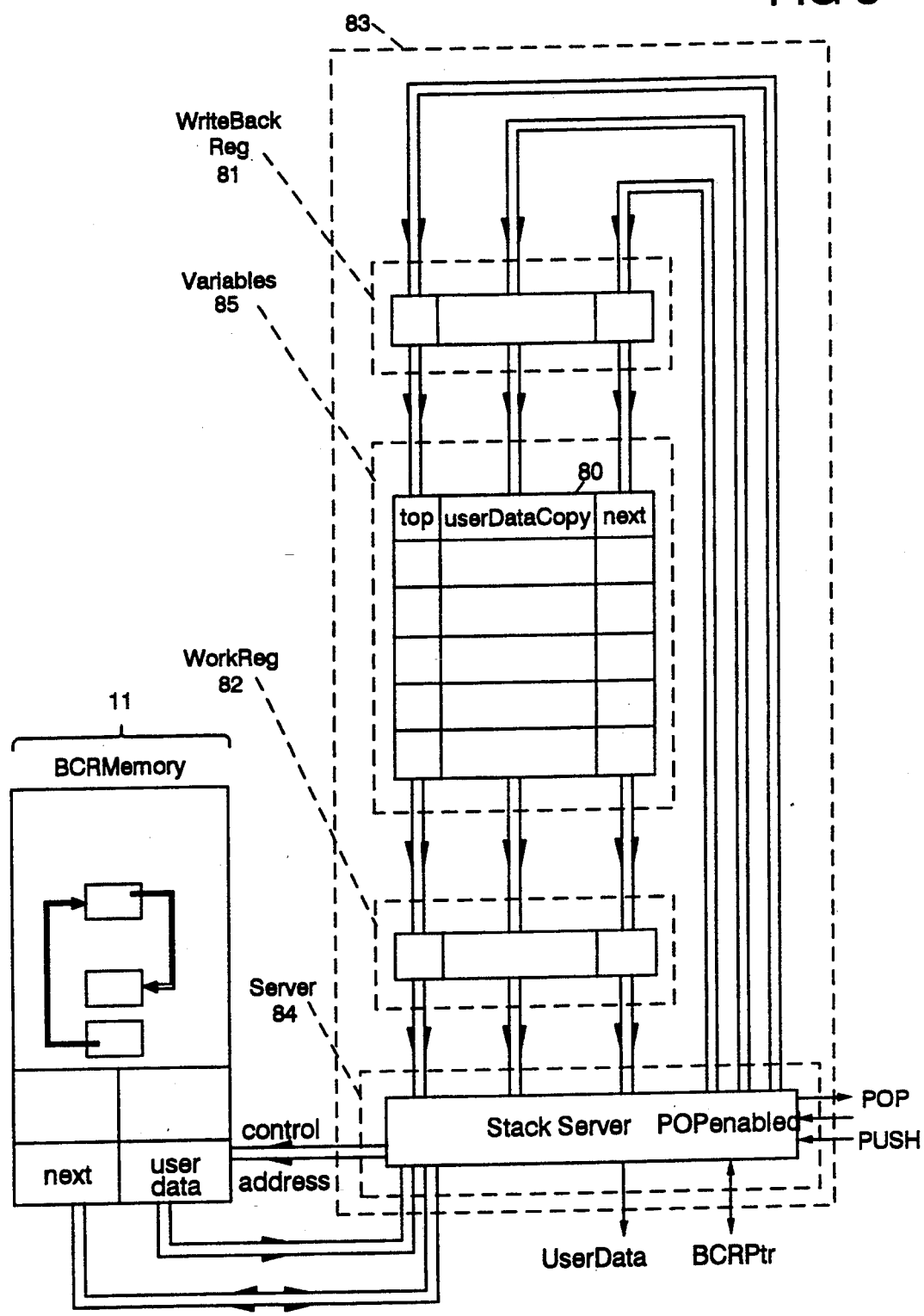
FIG. 8 shows a block diagram of a multiple stack manager.
Figure 9:
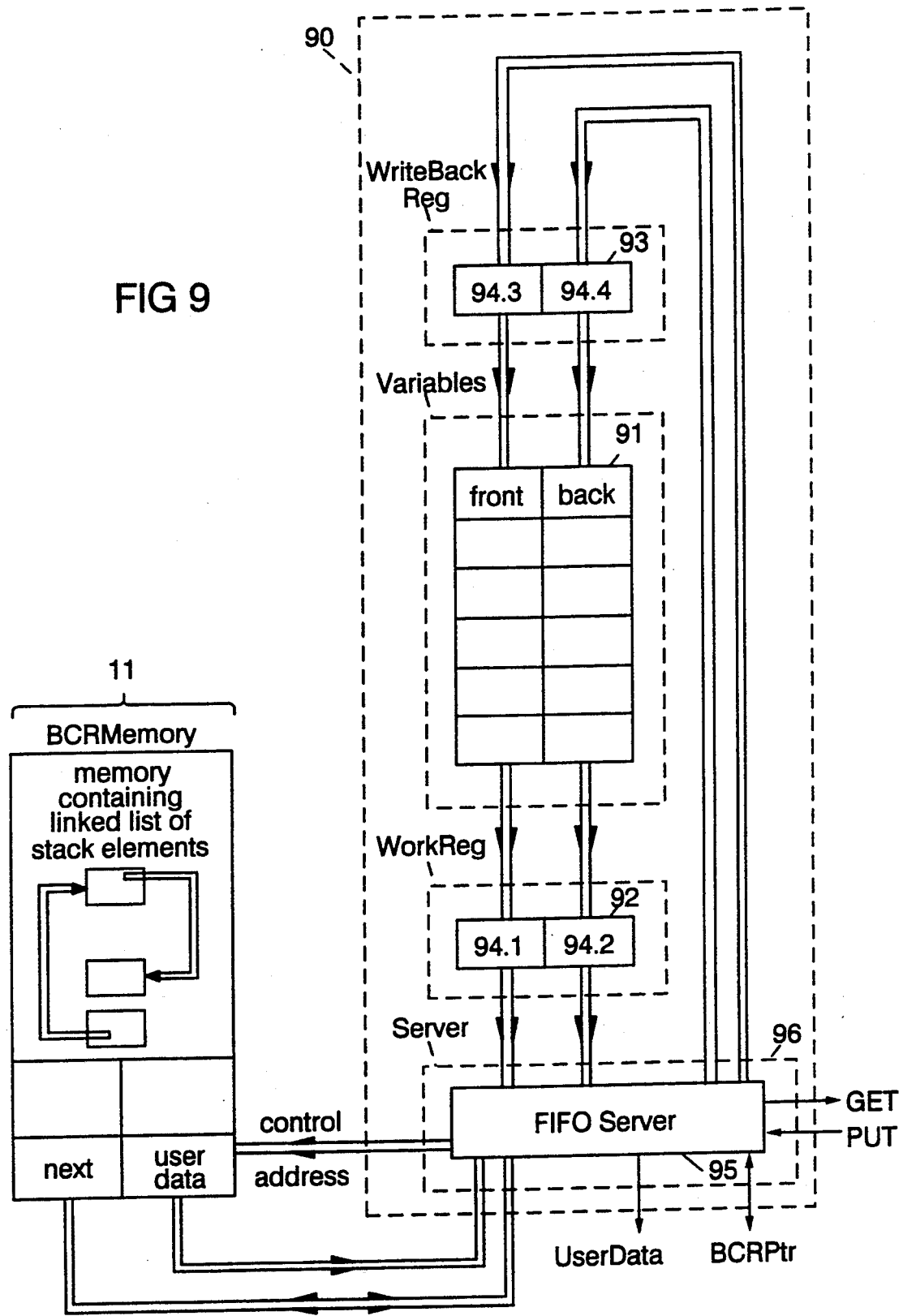
FIG. 9 shows a block diagram of a multiple FIFO manager.

The second embodiment of the present invention relates to a system comprising a buffer manager 83 and a data memory being subdivided into buffers of different size. Therefore the stack manager and the free buffer linked list have to be modified. For each size of buffers a corresponding stack is employed, such that it is relatively easy to support buffers of different sizes. The multiple n-stack (n being the number of stacks) implementation is based on the single stack implementation described in 1) Stack Manager. As there are now n stacks, there should in principle also be n registers which contain the necessary parameters (top, UserDataCopy, and next, see FIG. 5). Instead of n registers, the required parameters can also be stored in a RAM 80, as shown in FIG. 8. This RAM 80, being part of the variables block 85, has n rows with three fields for the parameters top, UserDataCopy, and next. Similar to the request manager 20, as illustrated in FIG. 4, two additional blocks, the WriteBackReg 81 and the WorkReg 82, are used to read the parameters from the RAM 80 and to write them back. The stack server 84 is comparable to the stack server 53 of the single stack implementation. The address applied to the RAM 80 determines on which of the n stacks the POP or PUSH operation takes place. Which size of buffer is to be popped from one of the n stacks has to be given by the user. In addition the single FIFO is extended to a multiple n-FIFO in the same way as the single stack is extended. The block diagram of the multiple FIFO manager 90 is shown in FIG. 9. For storing the parameters front(i) and back(i) a RAM 91 is employed. A WorkReg block 92 and a WriteBackReg block 93 are used for the parameters to be processed. Each of these blocks contains two registers 94.1–94.4. The FIFO server 95 is comparable to the server 62 of the single FIFO implementation. The different rules and schemes described in context with the first embodiment may be employed.

Based on these embodiments different hardware implementations may be realized by adaptation to a given environment.

We claim:

1. A storage system consisting of a shared memory (10) subdivided into a plurality of buffers, a buffer-control memory (11) subdivided into as many sections for buffer control records (BCRs) as buffers exist, and a buffer manager (12), comprising:

a free-buffer manager (21; 83) controlling and organizing all of said buffers being free by keeping the corresponding BCRs in at least one free-buffer linked list (23.1), an allocated-buffer manager (22; 90) controlling and organizing all of said buffers being already allocated by keeping the corresponding BCRs in allocated-buffer linked lists (23.2–23.n), employing an allocated-buffer linked list (23.2–23.n) for each user, and a request manager (20) for granting or not granting a request of a user, based on a plurality of rules implemented in said request manager (20), involving a plurality of user-defined variables and system status variables, said request manager (20) comprising a storage (41) in which said plurality of user-defined and system status variables are stored, a work register (42) linked to said storage (41) such that the stored plurality of used user-defined and system status variables are made accessible, a server (43) determining whether a request is to be granted by employing said plurality of rules and plurality of variables which are made accessible by means of said work register (42), said user-defined variables being used for granting buffer allocation requests and said system status variables being controlled and updated by said request manager (20), said free-buffer manager (21; 83), said allocated-buffer manager (22; 90), and said request manager (20) being implemented as separate concurrently operating hardware units which are arranged such that different users can put/get data to/from buffers of said shared memory (10), and such that said free-buffer linked list (23.1) and said allocated-buffer linked lists (23.2–23.n) are concentrated in an interlaced list of BCRs in said buffer-control memory (11).

2. The storage system of claim 1, wherein said free-buffer linked list (23.1) is organized such that the free buffers appear to be stored in a stack.

3. The storage system of claim 2, wherein the free-buffer manager (21) comprises a server (52) and registers (54.1, 54.2, 54.3), such that a pointer to the first BCR (31.2) of said free-buffer linked list (23.1) and a pointer to the corresponding free-buffer (30.2) are kept in said registers (54.1, 54.2).

4. The storage system of claim 3, wherein said buffers being allocated are organized such that they appear to be stored in a first-in/first-out (FIFO) queue, by keeping the corresponding BCRs accordingly, and wherein a pointer to the front of an allocated-buffer linked list (23.2) and a pointer to the end of a list (23.2) are kept in said storage (60; 91).

5. The storage system of claim 4, wherein the free-buffer manager (83) comprises a random access memory (RAM) (80) storing pointers to said free-buffer linked lists.

6. The storage system of claim 1, wherein said free-buffer manager (21; 83) and said allocated-buffer manager (22; 90) comprises a server (52, 61; 84, 96) and a storage (56, 60; 85, 91).

7. The storage system of claim 1, wherein said shared memory (10) is subdivided into a plurality of buffers of different size and wherein said free-buffer manager (83) controls and organizes as many free-buffer linked lists as buffers of different sizes are given.

8. The storage system of claim 1, wherein a BCR (31.2) comprises a field (UserData) for the physical address of the corresponding buffer (30.2), and a field (next) for a pointer to another BCR (31.4) or a field (nil) for a flag marking the end of a linked list.

9. The storage system of claim 1, wherein a BCR comprises, either a field (next) for a pointer to another BCR or a field (nil) for a flag marking the end of a linked list, and wherein said BCR is directly mapped to a corresponding buffer, such that no additional field for the buffer address is required.

10. A method managing access of different users to a shared memory (10), said shared memory being subdivided into a plurality of buffers and being part of a storage system which further comprises a buffer-control memory (11), subdivided into as many sections for buffer-control records (BCRs) as buffers exist, and a buffer manager (12), said method comprising the steps of:
   a. organizing all free buffers of said shared memory as at least one chained queue of free buffers by keeping the corresponding BCRs in at least one free-buffer linked list (23.1);
   b. organizing all allocated buffers of said shared memory (10) as chained queues of allocated buffers, one queue for each of said users, by keeping the corresponding BCRs in as many allocated-buffer linked lists (23.2–23.n) as queues exist;
   c. allocating a free buffer to a user by removing the newly allocated buffer from said chained queue of free buffers and linking it to the queue of said user if still existing; otherwise, linking said newly allocated-buffer to a new queue by taking its BCR from said free-buffer linked list (23.1) and adding it to the allocated-buffer linked list (23.2–23.n) of said queue;
   d. releasing a buffer from the queue of a user by adding said released buffer to said chained queue of free buffers by taking its BCR from the allocated-buffer linked list (23.2–23.n) of said user and adding it to said free-buffer linked list (23.1);
   e. granting or not granting a request by said buffer manager for allocating a buffer to a user depending on (e.1) a plurality of rules implemented in said buffer manager (12), (e.2) a plurality of user-defined variables, and (e.3) system status variables, wherein all said variables are stored in a storage (41) linked to a work register (42) such that the stored plurality of user-defined and system status variables are made accessible, said user-defined variables being used for granting buffer allocation requests and said system status variables being controlled and updated by said buffer manager;
   wherein said queues are controlled and organized by said buffer manager (12) such that requests for allocation of buffers from different users are dealt with in a parallel manner.

11. The method of claim 10, wherein a BCR (31.2) comprises a first field (UserData) for the physical address of the corresponding buffer (30.2), and a second field (next) for a pointer to another BCR (31.4) or a flag (nil) marking the end of a linked list.

12. The method of claim 11, wherein the following user-defined variables:
   locMax[i] being the maximum number of buffers assigned to a user i,
   privMin[i] being the number of private buffers assigned to a user i,
and the following system status variable
   used[i] indicating the number of buffers being allocated by the user i,
are employed by said buffer manager (12) such that a request of a user i, is granted if, either used[i] is less than privMin[i], or if free buffers, not being reserved or allocated by other users, are available and used[i] is less than locMax[i], and the variable used[i] is increased after the request has been granted, and the variable used[i] is decreased after a release of a buffer.

13. The method of claim 11, wherein said free buffers are organized such that the buffers appear to be stored in a stack by keeping the corresponding BCRs in said free-buffer linked list, and wherein a pointer (top) points to the BCR at the top of said free-buffer linked list and a flag (nil) marks its end.

14. The method of claim 12, wherein a free buffer is popped from said stack, by making the physical address of the free buffer, corresponding to the BCR and being pointed to by said pointer (top), available to the user, and changing said pointer (top) such that it points to the next BCR of the free-buffer linked list, by copying the address of the next BCR, being stored in said second field of the BCR, into said pointer (top).

* * * * *